US008359568B2

(12) United States Patent
Baumann et al.

(10) Patent No.: US 8,359,568 B2
(45) Date of Patent: Jan. 22, 2013

(54) METHOD AND SYSTEM FOR AUTOMATICALLY ADDING GENERIC CHANGE LOG TO LEGACY APPLICATION

(75) Inventors: Juergen Baumann, Ammerbuch (DE); Friedrich Beichter, Altbach (DE); Jochen Hoffman, Boeblingen (DE); Thomas Pohl, Bemptlingen (DE)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 12/341,010

(22) Filed: Dec. 22, 2008

(65) Prior Publication Data

US 2010/0162204 A1     Jun. 24, 2010

(51) Int. Cl.
*G06F 9/44* (2006.01)
*G06F 17/40* (2006.01)

(52) U.S. Cl. ........ 717/106; 717/101; 717/141; 717/146; 719/317; 707/683; 707/684; 707/625; 707/803

(58) Field of Classification Search ............... 717/106
See application file for complete search history.

(56) References Cited

U.S. PATENT DOCUMENTS

| | | | |
|---|---|---|---|
| 5,903,898 A * | 5/1999 | Cohen et al. | 707/648 |
| 5,966,706 A | 10/1999 | Biliris et al. | |
| 6,604,068 B1 * | 8/2003 | Bukowski et al. | 703/22 |
| 6,772,168 B2 | 8/2004 | Ardoin et al. | |
| 7,058,656 B2 | 6/2006 | Winiger et al. | |
| 7,200,651 B1 | 4/2007 | Niemi | |
| 7,263,702 B2 | 8/2007 | Cho et al. | |
| 7,353,501 B2 | 4/2008 | Tang et al. | |
| 7,418,456 B2 | 8/2008 | Charlet et al. | |
| 7,757,269 B1 * | 7/2010 | Roy-Chowdhury et al. | 726/1 |
| 2003/0208464 A1 | 11/2003 | Lee et al. | |
| 2003/0220950 A1 | 11/2003 | Hiraoka et al. | |
| 2005/0021571 A1 * | 1/2005 | East | 707/201 |
| 2005/0114355 A1 | 5/2005 | Nuttila | |
| 2006/0218147 A1 | 9/2006 | Shrivastava et al. | |
| 2007/0061487 A1 * | 3/2007 | Moore et al. | 709/246 |
| 2008/0127070 A1 | 5/2008 | Barcia et al. | |
| 2008/0134161 A1 * | 6/2008 | Chamieh et al. | 717/166 |
| 2008/0184201 A1 | 7/2008 | Burns et al. | |
| 2008/0263505 A1 * | 10/2008 | StClair et al. | 717/101 |

* cited by examiner

*Primary Examiner* — Lewis A Bullock, Jr.
*Assistant Examiner* — Mohammed Huda
(74) *Attorney, Agent, or Firm* — William A. Kinnaman, Jr., Esq.; McGinn IP Law Group, PLLC

(57) ABSTRACT

A data management method includes accessing data objects in an application written in C/C++ for change-logging and multi-step redo/undo, wherein the data objects are organized in a binary format and are devoid of self-describing information, and wherein the accessing the data objects is structured in a plurality of layers, the plurality of layers including a semantic layer, a change log layer, and a repository layer, dynamically analyzing the data objects to recognize all changes made by any of a plurality of users for all data types used by the application, the dynamically analyzing the data including using semantic analysis to track changes and identifying any changes in any of the data objects, and using generated wrapper classes to convert between C/C++ data structures and generic data format, wherein the wrapper classes are generated from developer provided annotations with C/C++ data structure declarations.

1 Claim, 10 Drawing Sheets

```
/**
 * @transformable
 * @id( fieldname="ulChpid", fieldname="ulCSId", parent="lpChpidProc" )
 */
typedef struct tagHCHPID
{
#include "object\hobj.h"
  /**
   * @idField
   * @toString(pattern="%02.2X", castBefore="int")
   * @import(pattern="%X")
   */
  CHPID        ulChpid;
  /**
   * @transformable
   * @reference
   * @list
   */
  LPVLA        vlaChpidPartLinks;   // Points to HCHPIDPART link objects
  /**
   * @transformable
   * @toString(pattern="%X")
   */
  HCHPID_TYPE           ulType;
  /**
   * @transformable
   * @toString(pattern="%c")
   */
  HCHPID_MANAGED        eManaged;
} HCHPID;
```

FIGURE 6

Figure 9
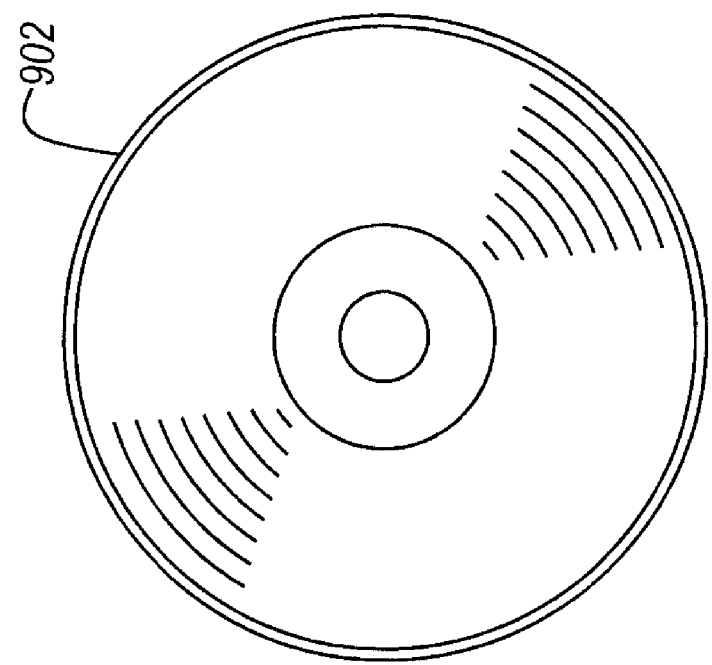
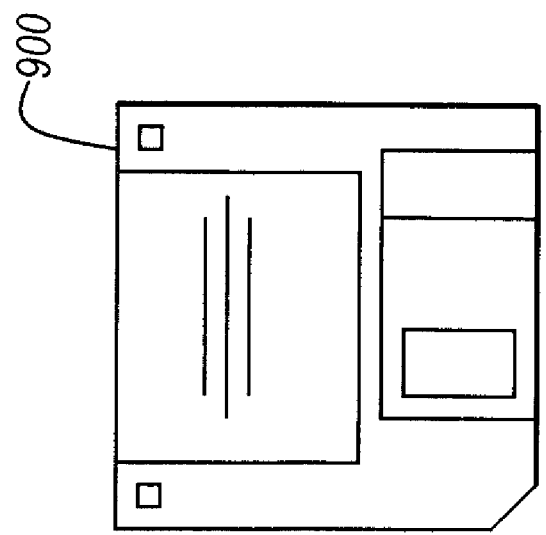

METHOD AND SYSTEM FOR AUTOMATICALLY ADDING GENERIC CHANGE LOG TO LEGACY APPLICATION

BACKGROUND OF THE INVENTION

1. Field of the Invention

The present invention generally relates to a method and apparatus for data management and more particularly to a data management method and system for legacy applications.

2. Description of the Related Art

Hardware Configuration Manager (HCM) is a legacy PC client application connecting to a host server application. The data repository is a binary file, which uses pointers for linking related data structures together, which describe the I/O configuration of a system processor complex. Multiple clients can access the same configuration repository. Therefore, a fast resynchronization mechanism between multiple clients is needed. As a solution to this problem, only the changes of a client are gathered and communicated among the concurrently accessing clients.

Accordingly, for a legacy data managing application, which uses a binary data format, a change log, which collects the changes of each client, needs to be added on the host. The data format needs to be compatible across software versions since it contains vital configuration data for the installation running different operating system versions in parallel.

Certain solutions use database systems. The use of database systems, however, is not appropriate since the application does not have a central data access API to map an add, update, or delete request to a database.

Other solutions use library and revision control systems. These systems compare text or binary files completely to calculate the differences. A drawback of the library and revision control systems is that the entire binary file must be sent to the repository.

Furthermore, other solutions use diff/patch tools. These solutions also compare text or binary files completely to calculate the differences. Patches only contain the differences but cannot resolve conflicts between different patches of the same data due to the missing semantics of the changes.

Comparing binary data in a byte-oriented fashion does not result in a semantically rich change log. Object semantics must be reflected in the change records to allow recognition of individually named members/fields of objects.

SUMMARY OF THE INVENTION

Changes to legacy applications often require large redesign effort. Adding a change log to a data managing application usually requires a central place where any change to the data (e.g., add/update/delete) is recorded. The risk of error intrusion by regression or missing changes is high. A solution is required that covers all places for data updates, can be automated, is generic, is scalable, and does not require much change to the existing code.

In view of the foregoing and other exemplary problems, drawbacks, and disadvantages of the conventional methods and structures, an exemplary feature of the present invention is to provide a method and structure that adds undo/redo functionality and change-logging to a large scale legacy application written in C/C++, with minimal invasion.

In a first exemplary, non-limiting aspect of the present invention, a data management method includes accessing data objects in an application written in C/C++ for change-logging and multi-step redo/undo, wherein the data objects are organized in a binary format and are devoid of self-describing information, and wherein the accessing the data objects is structured in a plurality of layers, the plurality of layers including a semantic layer, a change log layer, and a repository layer, dynamically analyzing the data objects to recognize all changes made by any of a plurality of users for all data types used by the application, the dynamically analyzing the data including using semantic analysis to track changes and identifying any changes in any of the data objects, and writing generic functions, which are not linked to existing object types, for reading and writing C/C++ data structures, the writing generic functions including extracting information from annotations of C/C++ data structure declarations, annotating the data structure declarations with meta-information, the meta-information being lexically spatially proximate to the data structure declarations, parsing the annotations and the data structure declarations, combining the annotations and the data structure declarations into an intermediate data structure, and generating generic wrapper classes using the intermediate data structure. The semantic layer uses an application specific semantic analysis mechanism to identify when data objects have been changed, converts the objects from C/C++ data structures into a generic format using the wrapper classes, sends change notifications containing the objects in generic format to the change log layer, receives changes from the change log layer, and applies the changes received from the change log layer to the data objects, using the wrapper classes to convert the objects in generic format to C/C++ data structures. The change log layer collects and maintains all changes of an application session and provides the changes to the repository layer. The repository layer saves information of change records in a central persistent repository, wherein the repository layer saves the data objects and change information.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 6 illustrates an exemplary annotation according to certain exemplary embodiments of the present invention, associated with the method 400 illustrated in FIG. 4;

FIG. 9 illustrates a storage medium 900/902 for storing steps of a program of a method according to certain exemplary embodiments of the present invention.

DETAILED DESCRIPTION OF EXEMPLARY EMBODIMENTS OF THE INVENTION

Figure 1A:
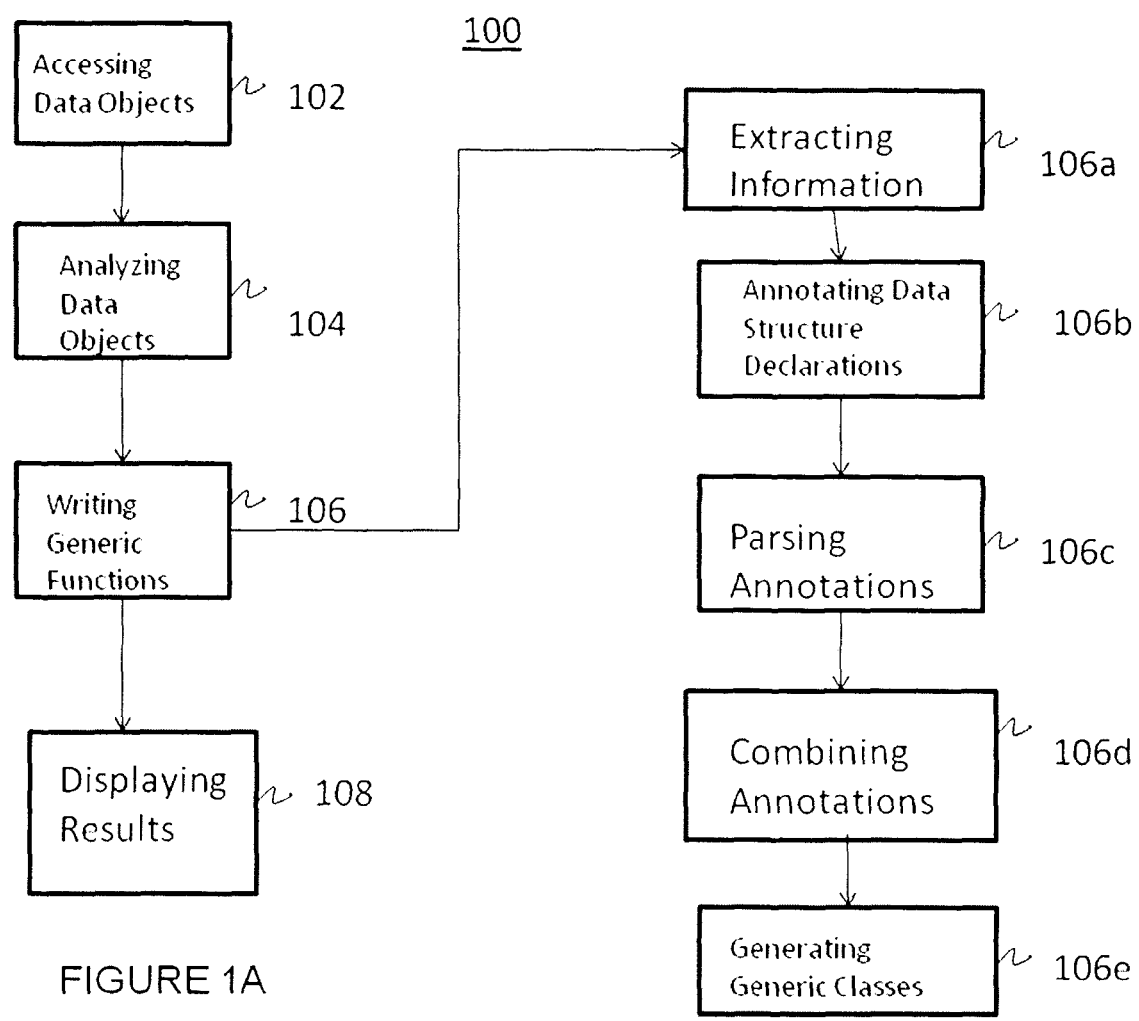
FIG. 1A illustrates a data management method 100 in accordance with an exemplary embodiment of the present invention.

Referring now to the drawings, and more particularly to FIGS. 1A-9, there are shown exemplary embodiments of the method and structures according to the present invention.

The method and system of the present invention allows establishing a clean layer for monitoring data access in a generic way. Given such a data-access layer, a generic change log with undo/redo functionality can be implemented easily for existing C applications.

While it appears possible, in principle, to implement the HCM repository as a database in an off-the-shelf database system, the required effort would be prohibitive. That is, there is no central API for data access in the HCM that would allow one to easily connect to a standard database. In addition, the closely related HCD repository cannot be implemented as a database, because other operating system software components depend on the current HCD repository format.

Furthermore, while existing library systems use a similar approach, they work on text files, or are byte-oriented, whereas the present invention puts on a semantic structure to the binary data to model the objects and attributes. The generic solution does not require explicitly written code for each object type.

Library systems typically compare full byte streams on a server. Sending two complete variants of a large repository to a server for comparison is not feasible on every change in an interactive application. The comparison for generating the change log entries is done on the client, thus reducing network traffic and expensive host processing cycles.

The present invention is able to add undo/redo functionality and change-logging to a large legacy application written in C/C++, with minimal invasion. Minimally-invasive means that the bulk of the source code remains untouched, so that required regression-test effort is minimized. For this purpose, existing data structures are analyzed dynamically in order to allow recognition of changes for all relevant data types used by the application. An abstraction of the internal C data types is needed. The C structs are processed in a different way, because the layout of the structs in C is lost at runtime. This can be achieved by generating wrapper classes to convert data at runtime between C structures and a generic data format, thus incorporating the needed layout knowledge.

A parser extracts information from the developer-provided annotations on the C struct declarations. Annotating the struct declarations with meta-information allows a solution without an additional data dictionary.

Declarative type information and meta-information are thus lexically close, which is important for keeping meta-information and data structures in synch while development remains ongoing, especially with large teams. Annotating additional information for fields or data types can be added easily, providing for extendibility.

A special-purpose compiler is used to parse the annotations and the struct definitions, and to combine them into an intermediate data structure. A code generator (i.e., back-end of the special-purpose compiler) then uses this intermediate data structure to generate wrapper classes. By using the annotations and the special-purpose compiler, all existing data structures can remain untouched (except for the added annotations that are lexical comments to the C/C++ compiler).

The present invention not only provides a base for a fast resynchronization among the clients, but also allows building a data base repository from the captured data in the change log and allows the implementation of a multi-step undo/redo functionality, even across sessions.

FIG. 1A illustrates a data management method 100 according to certain exemplary embodiments of the present invention, which is structured in a plurality of layers. The layers include a semantic layer, a change log layer, and a repository layer (e.g., see FIG. 2).

The method 100 includes accessing 102 data objects in an application written in C/C++ for change-logging and multi-step redo/undo. The data objects are organized in a binary format and are devoid of self-describing information. The accessing the data objects is structured in a plurality of layers. The layers include a semantic layer, a change log layer, and a repository layer (see FIG. 2).

After the data objects are accessed, the method dynamically analyzes 104 the data objects to recognize all changes made by any of a plurality of users for all data types used by the application. The analyzing includes using semantic analysis to track changes and identifying any changes in any of the data objects.

After the data objects are analyzed, the method writes generic functions 106, which are not linked to existing object types, for reading and writing C/C++ data structures. Writing the generic functions includes extracting information 106a from annotations of C/C++ data structure declarations, annotating 106b the data structure declarations with meta-information (see FIG. 6—Annotation Example), parsing 106c the annotations and the data structure declarations, combining 106d the annotations and the data structure declarations into an intermediate data structure, and generating 106e generic wrapper classes using the intermediate data structure. The meta-information, which annotates the data structure declarations, is lexically spatially proximate to the data structure declarations.

Figures 1B, 1C:
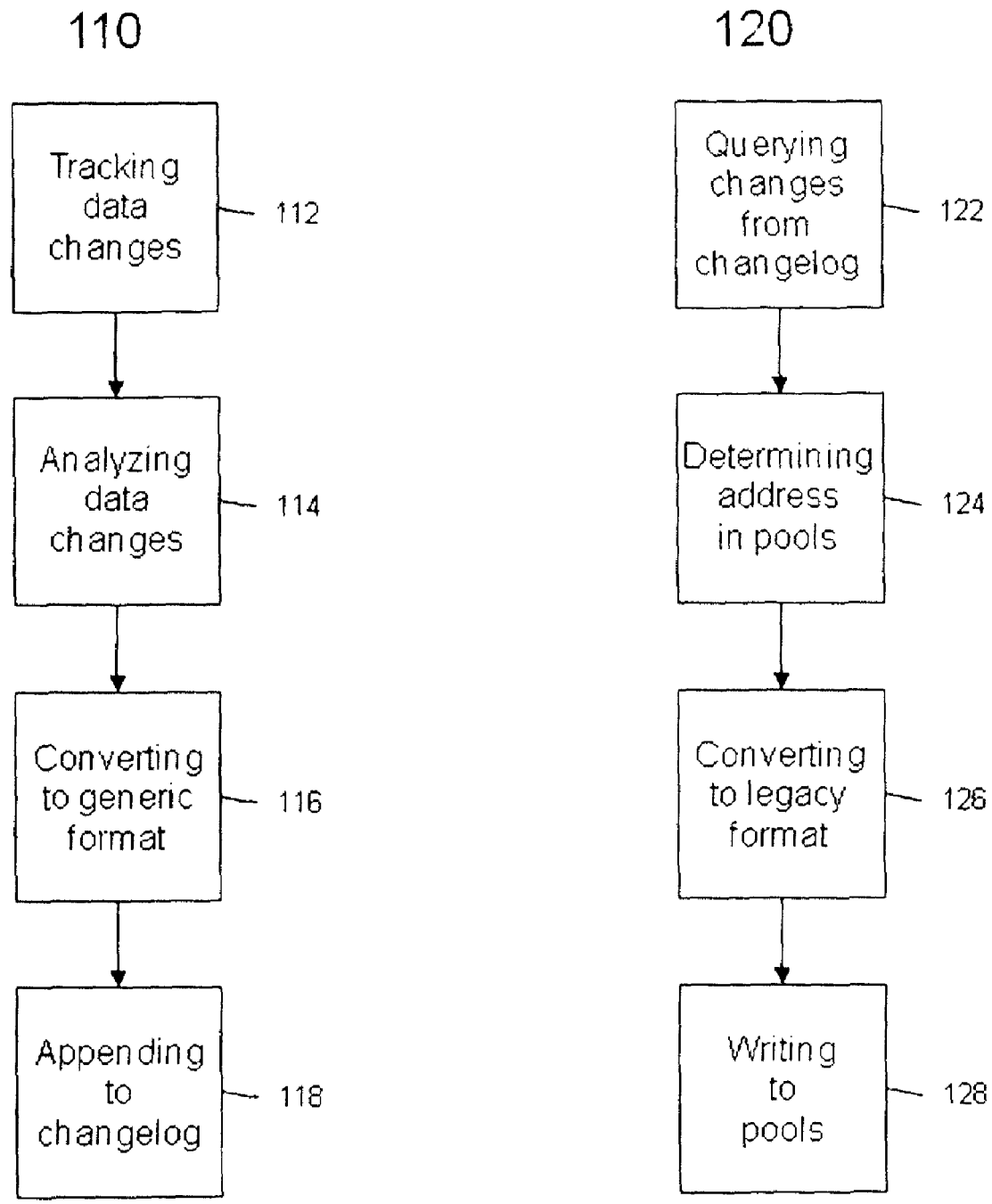
FIG. 1B illustrates a data management method 110 in accordance with another exemplary embodiment of the present invention.
FIG. 1C illustrates a data management method 120 in accordance with another exemplary embodiment of the present invention.

FIG. 1B illustrates a data management method 110 according to other exemplary embodiments of the present invention, which is structured in a plurality of layers. The layers include a semantic layer, a change log layer, and a repository layer (e.g., see FIG. 2).

The method 110 includes tracking data changes 112 in an application written in C/C++ for change-logging and multi-step redo/undo. The data objects are organized in a binary format and are devoid of self-describing information.

After the data objects are changed, the method dynamically analyzes 114 the changed data objects to recognize the kind of changes made (i.e., add, modify, delete). The analyzing includes using semantic analysis to track changes and identifying any changes in any of the data objects.

After the data objects are analyzed, the method converts C/C++ data structures 116 into a generic format, using wrapper classes generated from the annotations at build time.

After the data objects are converted, the method appends 118 the objects in generic format as change records to a change log.

FIG. 1C illustrates a data management method 120 according to other exemplary embodiments of the present invention, which is structured in a plurality of layers. The layers include a semantic layer, a change log layer, and a repository layer (e.g., see FIG. 2).

The method 120 includes querying data changes 122 from a change log. The data objects are organized in a generic format, organized as change records and include self-describing information.

After the change records are queried, the method looks up 124 the address of the corresponding data objects in the pools.

After the pool address is determined, the method converts 126 the data objects from generic format to the legacy format, using the generated wrapper classes. The method writes 128 the legacy format data to the determined address in the pools.

Figure 2:
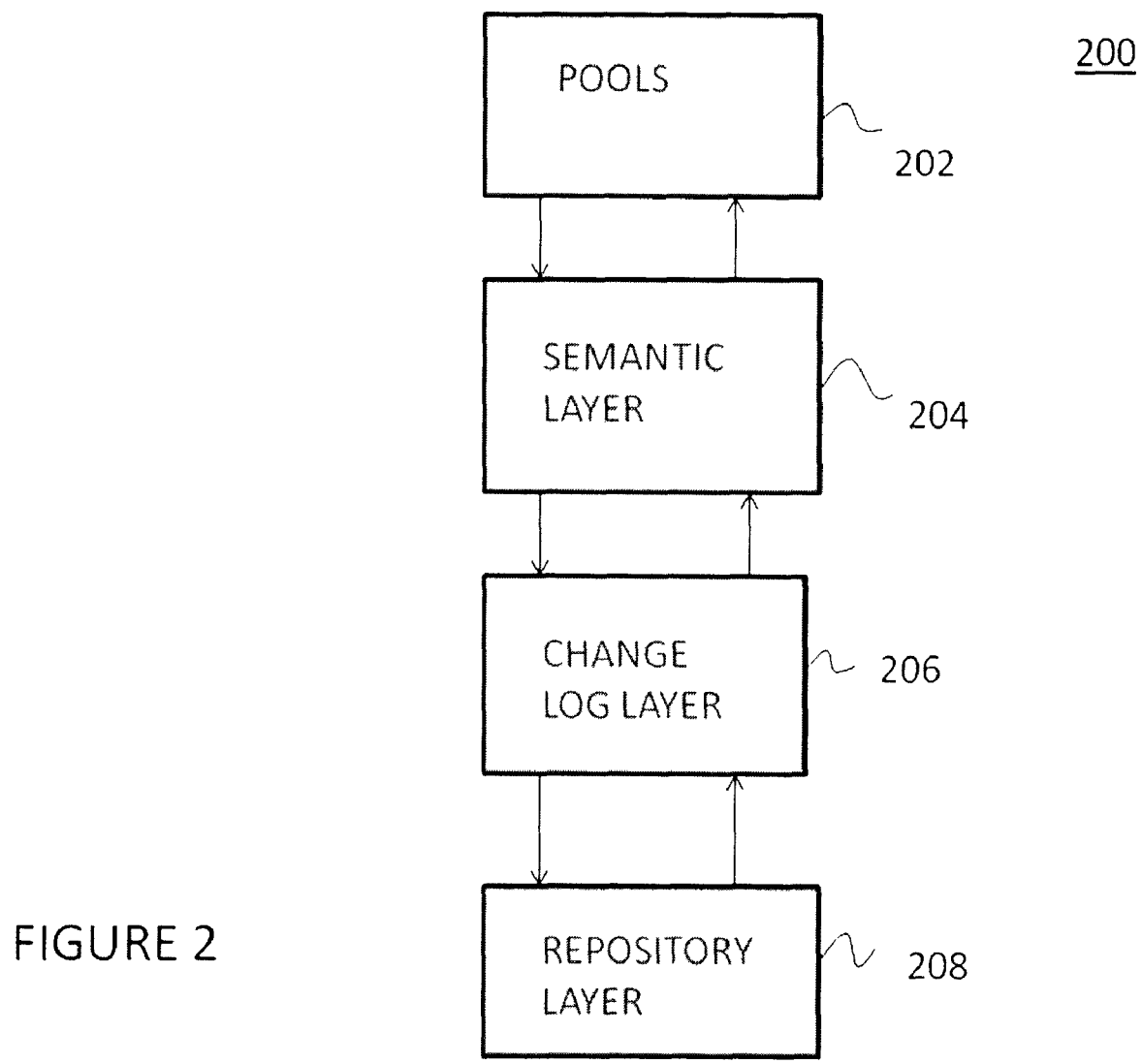
FIG. 2 illustrates a data pool structure 200 in accordance with an exemplary embodiment of the present invention.

FIG. 2 illustrates the structure 200 in which the data objects are accessed. The legacy application organizes the data objects in memory pools 202. Data structures in pools refer to each other with absolute pointers. The pool structure remains unchanged. Furthermore, data manipulation logic remains unchanged.

According to certain exemplary embodiments of the present invention, the access of the method (and system) to the data objects for change-logging and multi-step undo/redo is structured in different layers including a semantic layer 204, a change log layer 206, and a repository layer 208.

The semantic layer 204 uses a semantic analysis mechanism to identify when data objects have been changed, converts the objects from C/C++ data structures into a generic format using the wrapper classes, sends change notifications containing the objects in generic format to the change log layer, receives changes from the change log layer, and applies the changes received from the change log layer to the data objects, using the wrapper classes to convert the objects in generic format to C/C++ data structures.

The semantic layer 204 links into the existing one-step undo mechanism. The semantic layer 204 identifies when objects have been changed and sends change notifications to the change log layer. On undo or redo actions, the semantic layer 204 receives changes from the change log layer and applies the changes to the pools in memory. The data format is generic and therefore does not use addresses in memory to refer to data objects. The wrapper classes of the semantic layer provide means to build a unique ID that is used to refer to a data object.

The change log layer 206 collects and maintains all changes of an application session and provides the changes to the repository layer.

The change log layer 206 layer collects and maintains all changes of one application session. The change log layer 206 registers itself to the semantic layer 204 as a change observer (Observer design pattern) to obtain change events. The change log layer 206 provides the changes to the repository layer 208. Changes are handled as ChangeRecord objects (see FIG. 3) which can represent add, delete, or modify changes, or a collection of such changes.

The repository layer 208 saves information of change records in a central persistent repository, where the repository layer saves the data objects and change information.

The repository layer 208 saves the information of the change records in a persistent repository. The repository layer 208 saves the objects themselves, as well as the change information in a change log. The repository layer 208 reads data objects from the repository or change log to provide it to the change log layer 206 as ChangeRecord objects.

The layer approach of the present invention allows the system to exchange each single layer.

Figure 3:
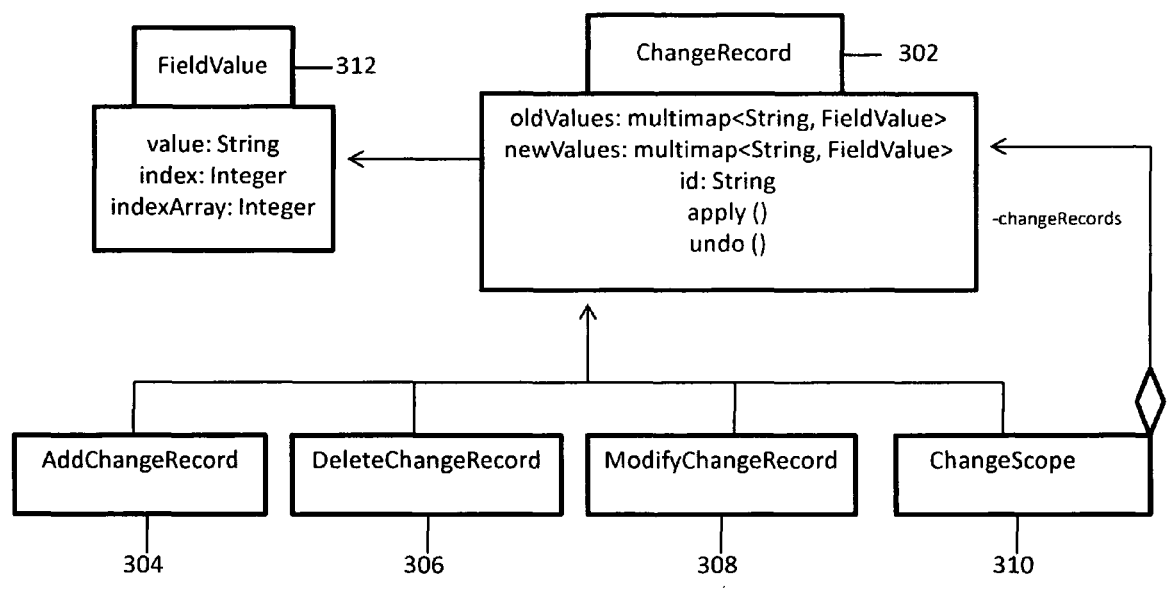
FIG. 3 illustrates an exemplary change record object in a change log layer of the data pool structure 200 illustrated in FIG. 2, used by methods 100, 110, and 120 illustrated in FIGS. 1A, 1B, and 1C, respectively.

FIG. 3 illustrates an exemplary change record object in a change log layer of the data pool structure 200 illustrated in FIG. 2, used by methods 100, 110, and 120 illustrated in FIGS. 1A-1C, respectively.

A ChangeRecord 302 is an abstract representation of any changes that were done to data objects. Data objects are stored in generic format, using FieldValue 312 objects to represent data object fields.

An AddChangeRecord 304 describes a change that represents a data object that was added to the pools. It contains the added data object in generic format.

A DeleteChangeRecord 306 describes a change that represents a data object that was deleted from the pools. It contains the deleted data object in generic format.

A ModifyChangeRecord 308 describes a change that represents a data object that was modified in the pools. It contains the original data object, as well as the new data object, both in generic format.

A ChangeScope 310 is a ChangeRecord that describes a set of ChangeRecords. It is used to describe all changes that were part of a transaction.

Figure 4:
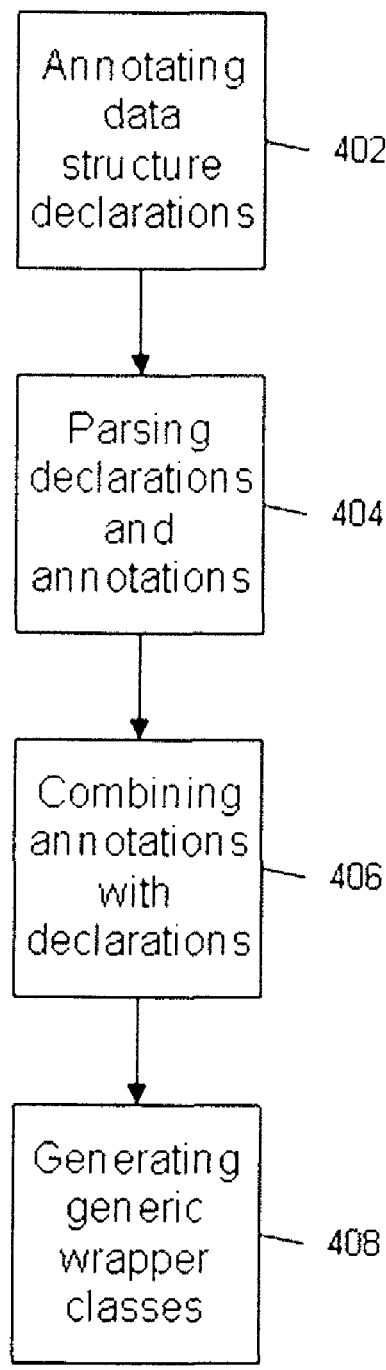
FIG. 4 illustrates a method 400 according to certain exemplary embodiments of the present invention to generate wrapper classes for data conversion.

FIG. 4 illustrates a method 400 according to certain exemplary embodiments of the present invention to generate wrapper classes for data conversion.

The developer analyzes the legacy data structures (header files) and annotates 402 the data structures with additional information. The additional information includes, for example, data format, whether a data field is part of the object ID, whether a data field is a value field or a pointer, whether the data field is a list, whether the data field is an array.

After annotating the legacy data structures, the method uses a compiler-compiler to parse 404 the annotated data structures, i.e., the C/C++ data structures, plus the information provided by annotations.

After the data structures are parsed, the method uses generic functions to combine 406 the parsed C/C++ structure information and the annotation information to a generic data dictionary description.

After the data structure information is combined, the method uses a skeleton processor to generate 408 generic wrapper classes for data conversion, from legacy format to generic format, and from generic format to legacy format. For each data type, one wrapper class is generated.

Figure 5:
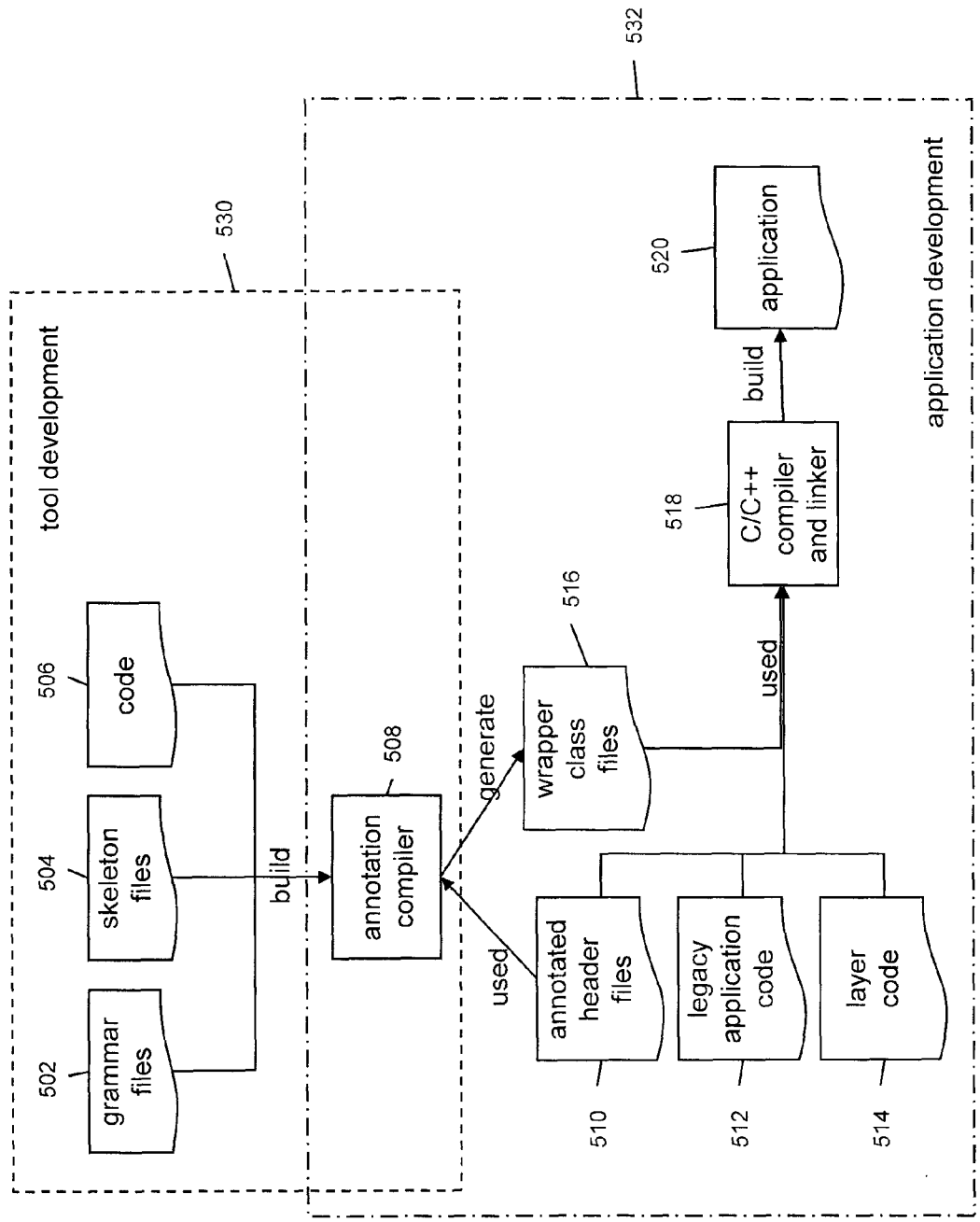
FIG. 5 illustrates exemplary tools and components associated with the data management methods 100, 110, 120, and 400.

FIG. 5 illustrates the tools and components used to build and use the wrapper classes for data object access. A parser grammar 502 for semantic annotations is the core of the special-purpose compiler 508 (annotation compiler). Text skeletons 504 contain fragments of to-be-generated wrapper class code. A compiler-compiler and a skeleton processing engine are used to build the annotation compiler 508. Building the annotation compiler is part of tool development activity 530. During building of the application 532, the annotation compiler is used to parse the data declarations 510 (header files) and generate the wrapper classes 516. Together with the legacy code 512 and the semantic, change log, and repository layer 514, the wrapper classes get built to the complete application 520.

Figure 7:
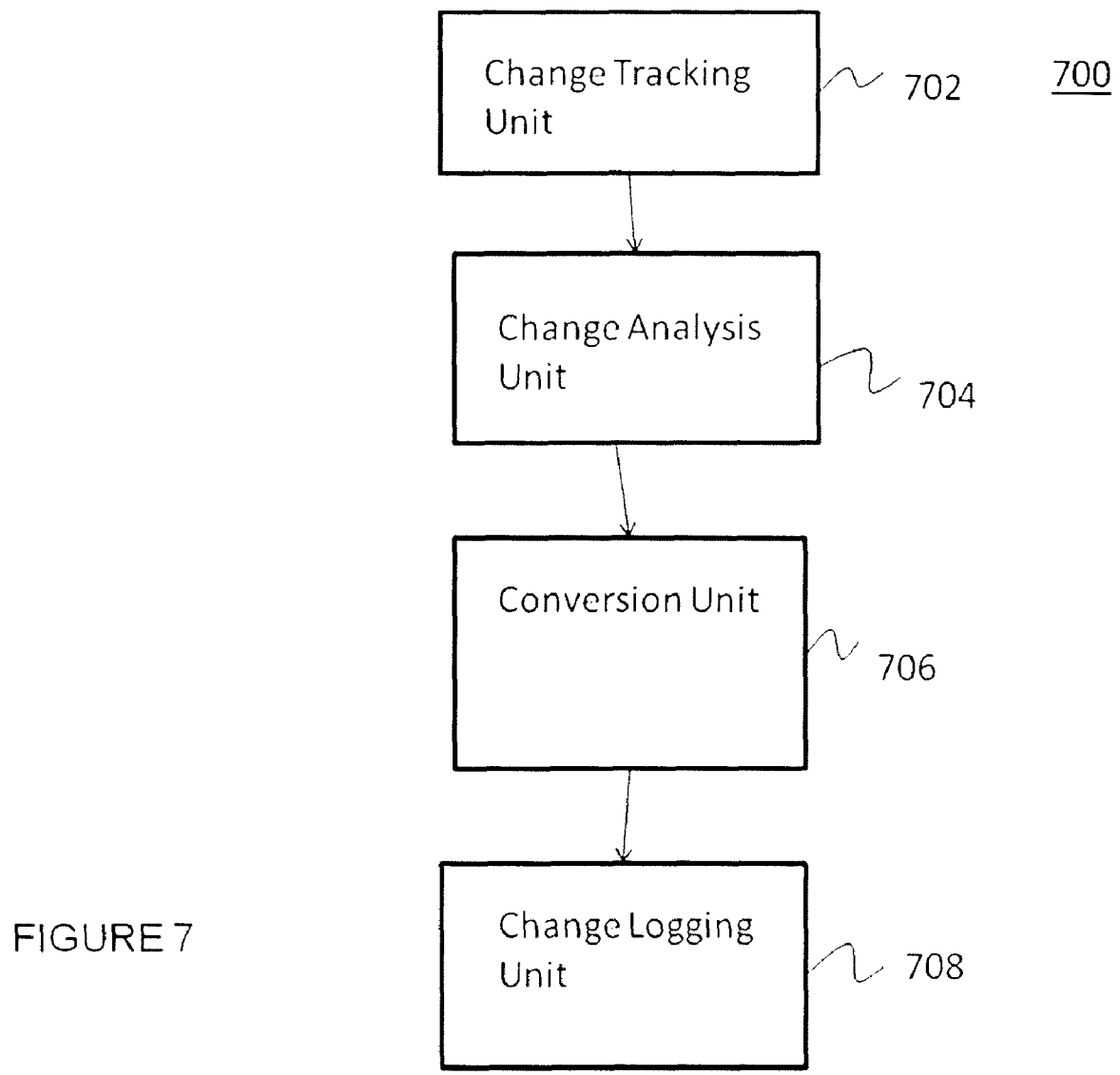
FIG. 7 illustrates a data management system 700 according to certain exemplary embodiments of the present invention.

FIG. 7 illustrates a data management system 700 according to certain exemplary embodiments of the present invention. The system includes a change tracking unit 702 that captures changes to the data objects, an analyzing unit 704 that analyzes and categorizes the data changes, a conversion unit 706 to convert them into a generic self-describing format, and a change logging unit 708 that makes changes available to a plurality of users.

Figure 8:
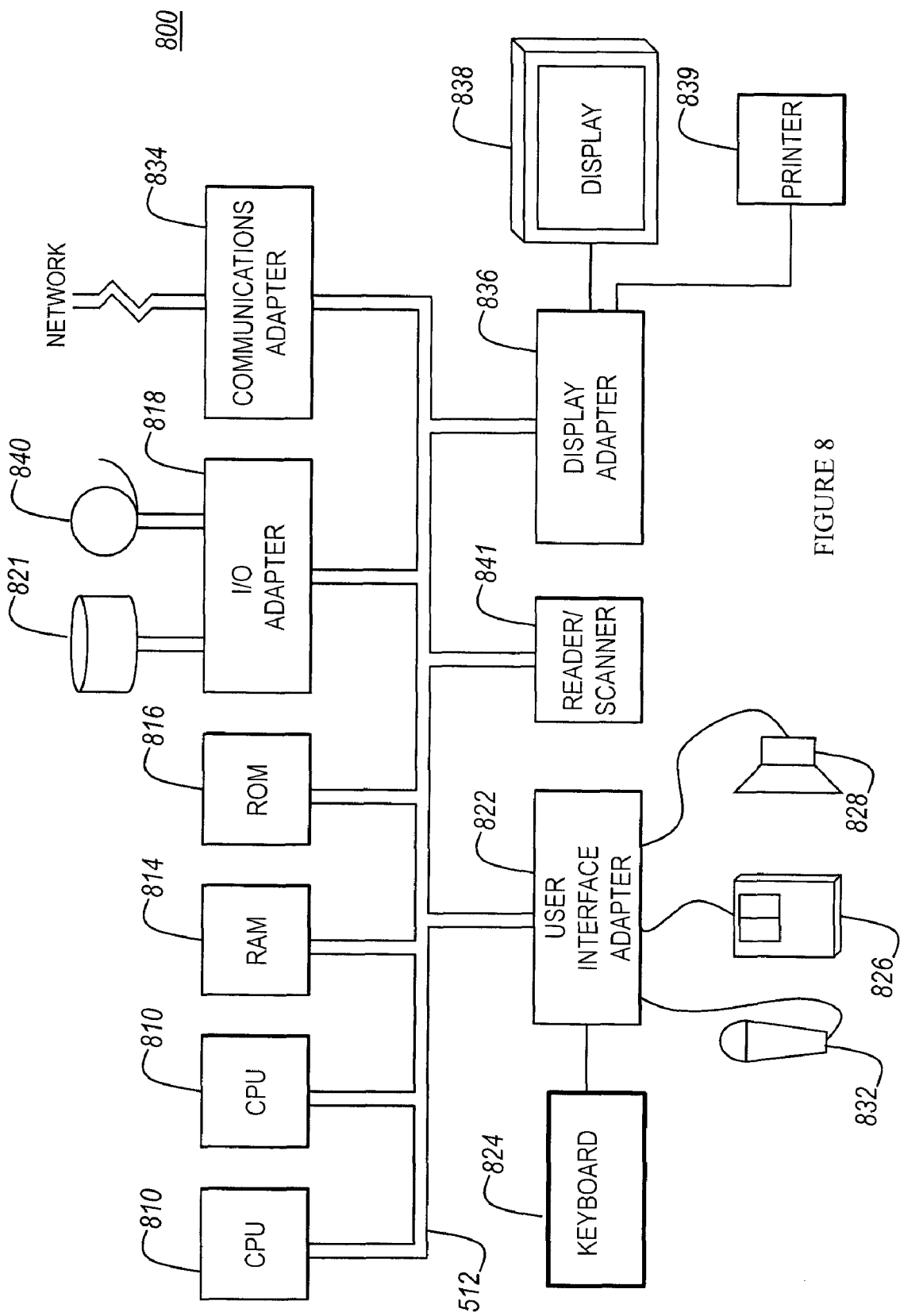
FIG. 8 illustrates an exemplary hardware/information handling system 800 for incorporating the present invention therein.

FIG. 8 illustrates a typical hardware configuration 800, which may be used for implementing the inventive rol system and method. The configuration has preferably at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, pointing stick 827 and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839. Further, an automated reader/scanner 841 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of storage media.

Thus, this aspect of the present invention is directed to a programmed product, including storage media tangibly embodying a program of machine-readable instructions executable by a digital data processor to perform the above method.

Such a method may be implemented, for example, by operating the CPU 811 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 811 and hardware above, to perform the method of the invention.

This storage media may include, for example, a RAM contained within the CPU 811, as represented by the fast-access storage for example. Alternatively, the instructions may be contained in another storage media, such as a magnetic data storage diskette 900 or compact disc 902 (FIG. 9), directly or indirectly accessible by the CPU 811.

Whether contained in the computer server/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, C+, etc.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A data management method, comprising:

accessing data objects in an application written in C/C++ for change-logging and multi-step redo/undo, wherein said data objects are organized in a binary format and are devoid of self-describing information, and wherein said accessing the data objects is structured in a plurality of layers, said plurality of layers comprising a semantic layer, a change log layer and a repository layer;

dynamically analyzing the data objects to recognize all changes made by any of a plurality of users for all data types used by the application, said dynamically analyzing the data comprising using semantic analysis to track changes and identifying any changes in any of the data objects, said dynamically analyzing being performed by a programmed computer processor; and writing generic functions, which are not linked to existing object types, for reading and writing C/C++ data structures, said writing generic functions comprising:

extracting information from annotations of C/C++ data structure declarations;

annotating the data structure declarations with meta-information, said meta-information being lexically spatially proximate to the data structure declarations;

parsing the annotations and the data structure declarations;

combining the annotations and the data structure declarations into an intermediate data structure; and generating generic wrapper classes using the intermediate data structure, wherein the semantic layer:

uses an application specific semantic analysis mechanism to identify when data objects have been changed;

converts the objects from C/C++ data structures into a generic format using the wrapper classes;

sends change notifications containing the objects in generic format to the change log layer;

receives changes from the change log layer; and applies the changes received from the change log layer to the data objects, using the wrapper classes to convert the objects in generic format to C/C++ data structures, wherein the change log layer collects and maintains all changes of an application session and provides the changes to the repository layer, and wherein the repository layer saves information of change records in a central persistent repository, where the repository layer saves the data objects and change information.

* * * * *